United States Patent
Caldwell et al.

(10) Patent No.: US 7,723,640 B2
(45) Date of Patent: May 25, 2010

(54) OPTICAL HORNED LIGHTPIPE OR LIGHTGUIDE

(75) Inventors: Scott Caldwell, Fairport, NY (US); Hugh T. McNair, Webster, NY (US)

(73) Assignee: Branson Ultrasonics Corporation, Danbury, CT (US)

(*) Notice: Subject to any disclaimer, the term of this patent is extended or adjusted under 35 U.S.C. 154(b) by 1027 days.

(21) Appl. No.: 11/446,370

(22) Filed: Jun. 2, 2006

(65) Prior Publication Data

US 2006/0219675 A1  Oct. 5, 2006

Related U.S. Application Data

(63) Continuation-in-part of application No. 10/729,048, filed on Dec. 5, 2003, now abandoned.

(51) Int. Cl.
*B23K 26/20* (2006.01)
(52) U.S. Cl. .................. 219/121.61; 219/121.63; 219/121.64; 219/121.73
(58) Field of Classification Search ................ 219/121.61–121.73, 121.85
See application file for complete search history.

(56) References Cited

U.S. PATENT DOCUMENTS

| | | | |
|---|---|---|---|
| 4,265,534 A * | 5/1981 | Remijan | 356/2 |
| 4,496,211 A | 1/1985 | Daniel | 385/31 |
| 4,533,243 A | 8/1985 | Zhukov et al. | 356/44 |
| 4,636,609 A | 1/1987 | Nakamata | 219/121.64 |
| 4,883,333 A | 11/1989 | Yanez | 385/33 |
| 5,017,140 A | 5/1991 | Ascher | 433/215 |
| 5,029,243 A * | 7/1991 | Dammann et al. | 219/121.77 |
| 5,059,917 A | 10/1991 | Stephens | 359/347 |
| 5,295,047 A | 3/1994 | Windross | 362/26 |
| 5,323,407 A | 6/1994 | Valette | 372/29.02 |
| 5,398,171 A | 3/1995 | Davenport et al. | 362/551 |
| 5,408,572 A | 4/1995 | Kriege | 385/43 |
| 5,425,124 A | 6/1995 | McRight et al. | 385/123 |
| 5,553,177 A | 9/1996 | Hering et al. | 385/31 |
| 5,558,788 A * | 9/1996 | Mashburn | 219/121.68 |
| 5,689,603 A | 11/1997 | Huth | 385/131 |
| 5,818,996 A | 10/1998 | Doyle | 385/115 |
| 5,822,354 A * | 10/1998 | Vitruk | 372/92 |
| 5,887,096 A | 3/1999 | Du et al. | 385/39 |
| 5,909,614 A * | 6/1999 | Krivoshlykov | 438/29 |
| 6,124,960 A * | 9/2000 | Garthe et al. | 398/194 |

(Continued)

FOREIGN PATENT DOCUMENTS

EP 0676653 A1 11/1995

(Continued)

*Primary Examiner*—Samuel M Heinrich
(74) *Attorney, Agent, or Firm*—Harness, Dickey & Pierce, P.L.C.

(57) ABSTRACT

A laser welding apparatus having a laser source outputting a laser beam and a light transmitting device being positioned downstream from the laser source. The light transmitting device transmits the laser beam therethrough. The laser beam exiting the light transmitting device has at least a zero order light lobe and a first order light lobe, wherein the zero order light lobe and the first order light lobe together defining an initial beam width. An optical device positioned downstream from the light transmitting device converges the first order light lobe with the zero order light lobe to define a final beam width that is narrower than the initial beam width.

10 Claims, 11 Drawing Sheets

U.S. PATENT DOCUMENTS

| | | | |
|---|---|---|---|
| 6,205,160 B1 | 3/2001 | Grewell | |
| 6,249,351 B1 * | 6/2001 | de Groot | 356/512 |
| 6,510,111 B2 * | 1/2003 | Matsuura | 369/44.32 |
| 6,528,755 B2 | 3/2003 | Grewell et al. | 219/121.63 |
| 6,829,412 B2 | 12/2004 | Li | 385/31 |
| 2002/0163735 A1 * | 11/2002 | Detlef et al. | 359/641 |

FOREIGN PATENT DOCUMENTS

| | | | |
|---|---|---|---|
| JP | 401069081 A * | 3/1989 | |
| JP | 2-55303 | 2/1990 | |
| JP | 402055303 A | 2/1990 | |
| JP | 411109280 A * | 4/1999 | |
| JP | 02000107879 A | 4/2000 | |
| JP | 02003071583 A | 3/2003 | |
| KR | 2003087355 A * | 11/2003 | |

* cited by examiner

OPTICAL HORNED LIGHTPIPE OR LIGHTGUIDE

CROSS-REFERENCE TO RELATED APPLICATIONS

This application is a continuation-in-part of U.S. patent application Ser. No. 10/729,048 filed on Dec. 5, 2003. The disclosure of the above application is incorporated herein by reference.

FIELD

The present invention relates generally to laser welding systems and, more particularly, relates to a laser welding system having an optically horned waveguide.

BACKGROUND

The statements in this section merely provide background information related to the present disclosure and may not constitute prior art.

Laser welding is commonly used to join plastic or resinous parts, such as thermoplastic parts, at a welding zone. An example of such use of lasers can be found in U.S. Pat. No. 4,636,609, which is expressly incorporated herein by reference.

As is well known, lasers provide a semi-focused beam of electromagnetic radiation at a specified frequency (i.e., coherent monochromatic radiation. There are a number of types of radiant sources available; however, infrared lasers or non-coherent sources provide a relatively economical source of radiative energy for use in heating a welding zone. One particular example of infrared welding is known as Through-Transmission Infrared (TTIr) Welding. TTIr welding employs an infrared laser capable of producing infrared radiation that is directed by lenses, diffractive optics, fiber optics, waveguides, lightpipes or lightguides through a first plastic part and into a second plastic part. This first plastic part is often referred to as the transmissive piece, since it generally permits the laser beam from the laser to pass therethrough. However, the second plastic part is often referred to as absorptive piece, since this piece generally absorbs the radiative energy of the laser beam to produce heat in the welding zone. This heat in the welding zone causes the transmissive piece and the absorptive piece to be melted and, with intimate contact, welded together.

However, in the case of those TTIr welding systems that employ a lightguide or lightpipe, the infrared laser light that exits the lightguide or lightpipe is often outwardly dispersed in a fan or cone shape as it passes through the transmissive piece. This dispersion of light may lead to oversized welding zones. That is, as the light exits the lightpipe or lightguide, the light fans outwardly and impacts a larger area of the absorptive piece and transmissive piece interface. This larger area is consequently heated causing a larger welding zone.

Accordingly, there exists a need in the relevant art to provide an apparatus for use with a lightpipe or lightguide that is capable of minimizing the size of a weld zone. Furthermore, there exists a need in the relevant art to provide an apparatus for use with a lightpipe or lightguide that is capable of focusing the laser light to a narrower area that could not otherwise be obtained simply with a conventional lightpipe or lightguide. Lastly, there exists a need in the relevant art to provide a lightpipe or lightguide with an optical horn capable of overcoming the disadvantages of the prior art.

SUMMARY

According to the principles of the present invention, a laser welding apparatus is provided having an advantageous construction and method of using the same. A laser welding apparatus comprises a laser source outputting a laser beam and a light transmitting device being positioned downstream from the laser source. The light transmitting device transmits the laser beam therethrough. The laser beam exiting the light transmitting device has at least a zero order light lobe and a first order light lobe, wherein the zero order light lobe and the first order light lobe together defining an initial beam width. An optical device positioned downstream from the light transmitting device converges the first order light lobe with the zero order light lobe to define a final beam width that is narrower than the initial beam width.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Furthermore, it should be understood that although the present invention is described in connection with TTIr welding, the present invention is equally applicable to other forms of welding and/or surface heating using light energy being passed through lightpipes or lightguides.

Figure 1:
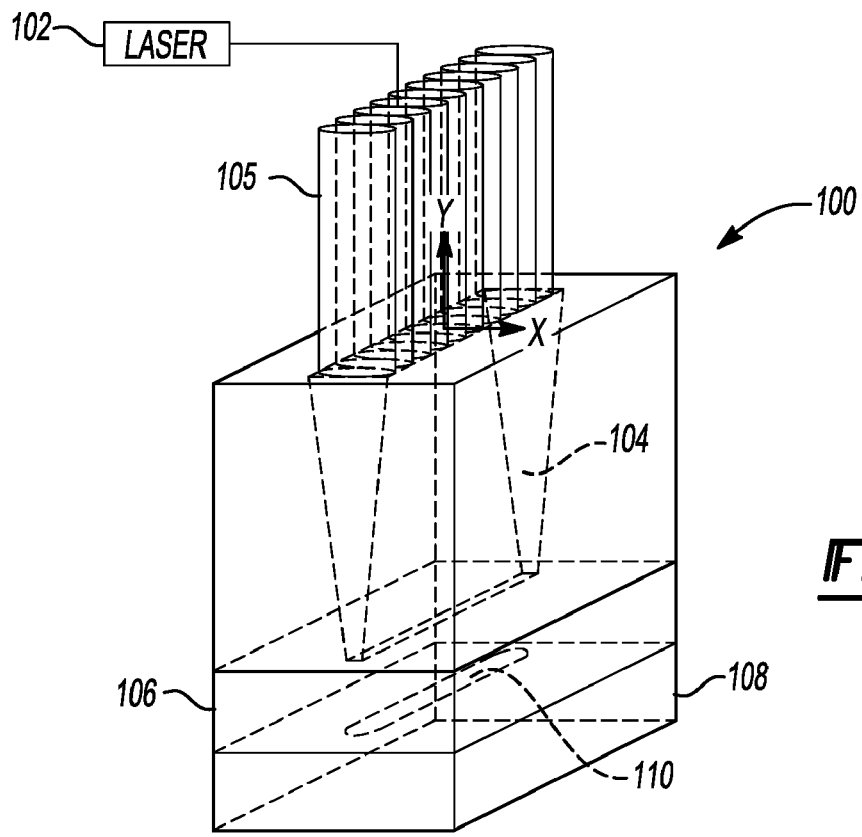
FIG. 1 is a schematic view illustrating a TTIr welding apparatus employing a narrowing tapered waveguide for use in welding a transmissive piece to an absorptive piece according to the prior art.
Figure 2:
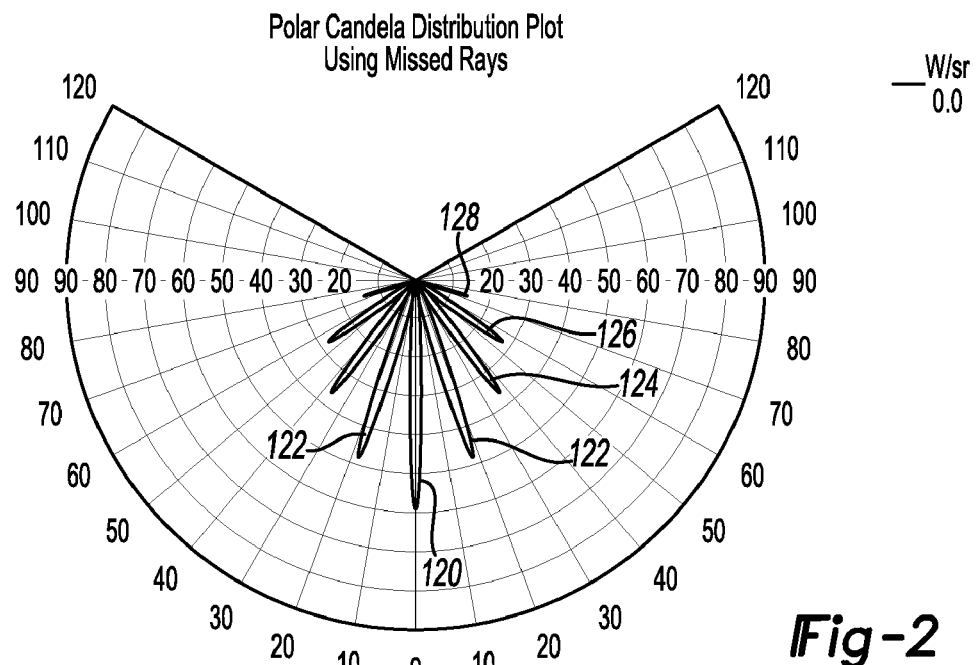
FIG. 2 is a candela plot of the welding apparatus illustrated in FIG. 1.
Figure 3:
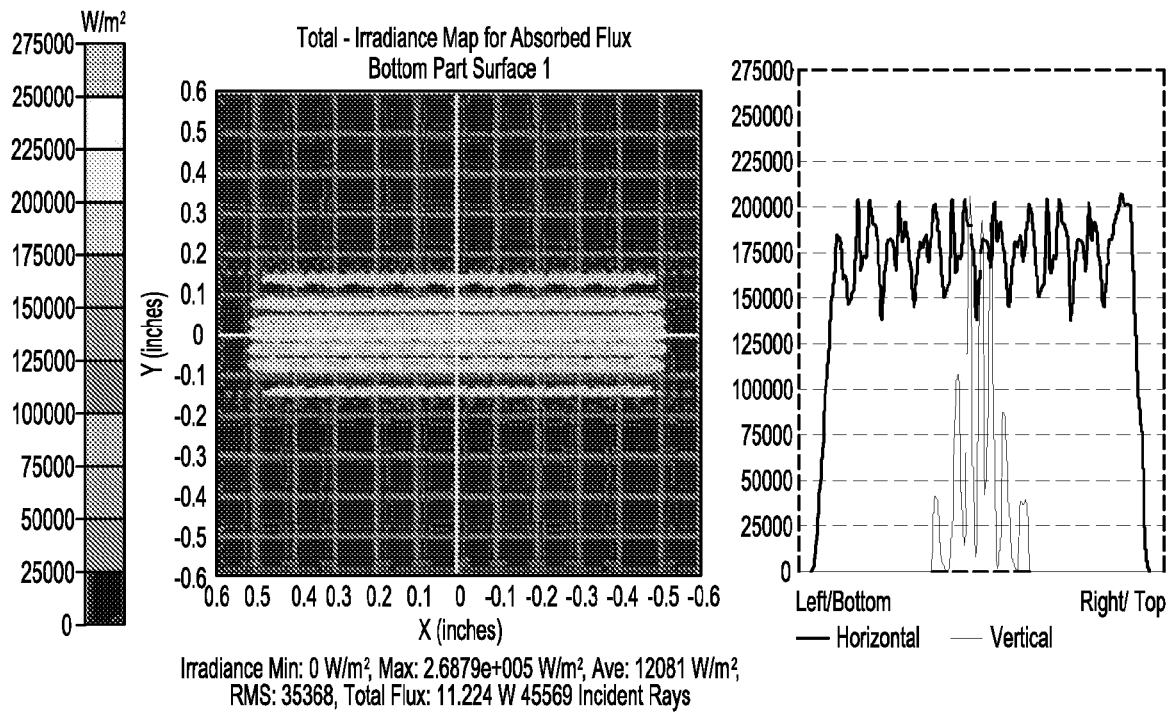
FIG. 3 is an irradiance plot at the surface between the transmissive piece and the absorptive piece of the welding apparatus illustrated in FIG. 1.

By way of background and with reference to FIGS. 1-3, TTIr welding systems 100 often include a laser 102 outputting a laser light to a conventional lightguide or fiber optic bundle 105 into a conventional waveguide 104. This laser light is transmitted along conventional waveguide 104 and through a transmissive piece 106. The laser light finally impacts an interface between transmissive piece 106 and an absorptive piece 108 at a weld zone 110. In other words, infrared light is directed through lightguide 105 to waveguide 104, which shapes the pattern of the laser light to form the weld. The laser light passes through transmissive piece 106 to absorptive piece 108. The laser light energy converts to heat, melting the plastic, and thus forming the weld.

As can be seen in FIG. 2, this laser light fans outwardly as it exits conventional waveguide 104 and may further fan outwardly due to the optical effects of transmissive piece 106. Consequently, weld zone 110 is substantially larger than the exit end of conventional waveguide 104 due to this effect. This angular distribution is exaggerated by the tapered sides of conventional waveguide 104. The farther weld zone 110 is spaced from the exit end of conventional waveguide 104, the greater the size of weld zone 110. That is, as the laser light exits conventional waveguide 104, the fan shape becomes larger causing a larger than desired weld zone 110.

There are times, however, that it is desirable to achieve a width of weld zone 110 that is narrower than the width of lightguides 105 that go into waveguide 104. In fact, there are times that it is desirable to simply minimize the width of weld zone 110.

The problem lies with the distance between the exit end of the waveguide 104 and weld zone 110. As can be seen in FIG. 2, which illustrates an angular (candela) distribution of the light coming out of the waveguide, the light spreads out angularly into various bounce orders as the waveguide narrows. Zero bounce order lobe 120, corresponding to no bounces through the waveguide, is at 0 degrees. First bounce order lobes 122, corresponding to one bounce in the waveguide, can be seen to either side of zero bounce order lobe 120. Additional bounce order lobes 124, 126, and 128 can be seen to the sides of first bounce order lobes 122. Referring to FIG. 3, the irradiance plot at the surface between transmissive part 106 and absorptive part 108 is illustrated. In this irradiance plot, each of the lobes 120-128 can be seen spanning nearly 0.2 inches along the Y-axis when used with a lightguide having a width of 0.1 inch. Therefore, the resulting fan shape (and thus weld zone) is greater than the width of the lightguide itself. Clearly this approach, alone, will not work to achieve a narrow weld zone.

Figure 4:
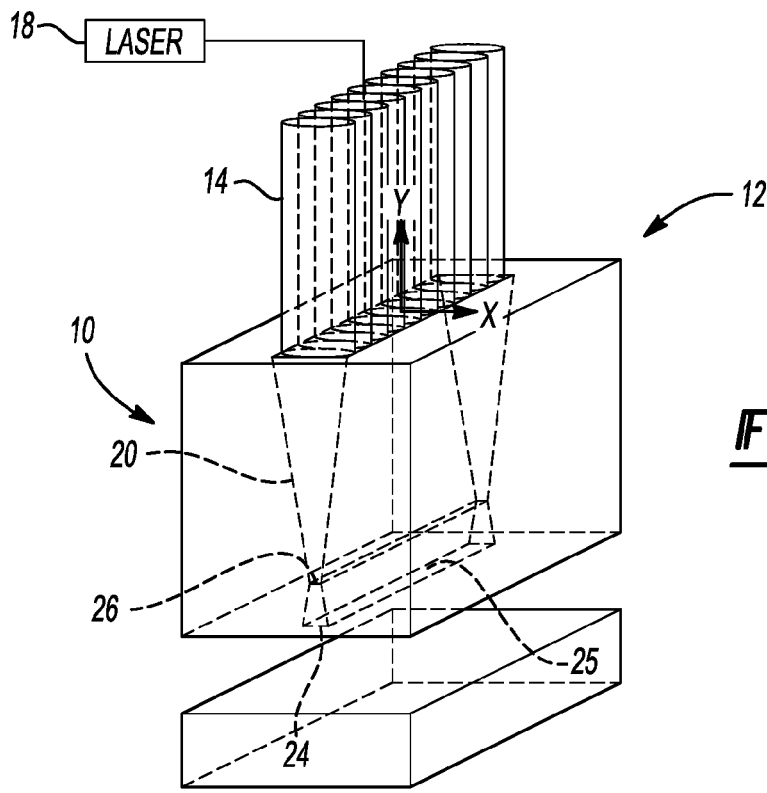
FIG. 4 is a schematic view illustrating a TTIr welding apparatus according to the principles of the present teachings employing a narrowing tapered waveguide in combination with an optical horn for use in welding a transmissive piece (removed for clarity) to an absorptive piece.

Referring now to FIG. 4, a lightpipe or lightguide assembly 10 is illustrated in accordance with the principles of the present invention. According to the present embodiment, lightpipe or lightguide assembly 10 is adapted for use with a TTIr welding system 12. As seen in FIG. 4, TTIr welding system 12 may include an optional fiber optic bundle 14 comprised of a plurality of optical fibers generally arranged in a circular pattern capable of carrying or transmitting radiative energy in the form of a laser beam therethrough. Fiber optic bundle 14 is operably coupled to a laser source 18, such as an infrared laser, according to known principles.

Figure 5:
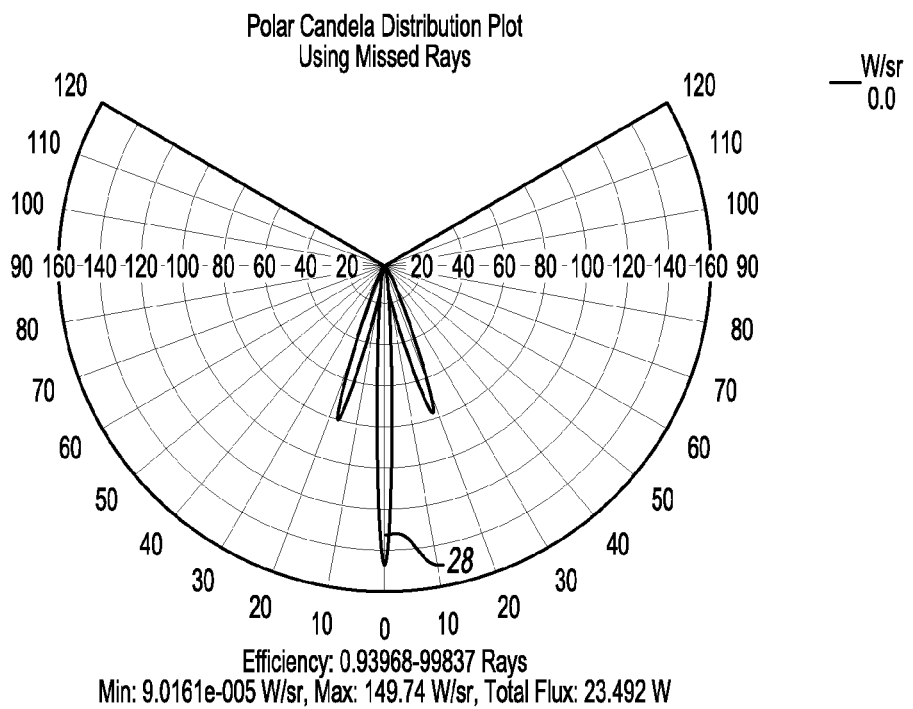
FIG. 5 is a candela plot of the welding apparatus illustrated in FIG. 4.

In order to limit the angular distribution of the laser light, lightpipe or lightguide assembly 10 comprises a lightpipe 20 and bounce planes 24 disposed at an exit end 26 of lightpipe 20. Bounce planes 24 form an optical horn 25 that work by bouncing or otherwise reflecting first bounce order lobes 122 of light exiting exit end 26 of lightpipe 20 into zero bounce order lobe 120 to form a combined light lobe 28 (FIG. 5). Since zero bounce order lobe 120 and first bounce order lobes 122 hold the majority of the light, the weld will be made substantially narrower. To achieve this effect, bounce planes 24 of optical horn 25 are selected such that they are one-half the angle of first bounce order lobes 122 of the uncorrected waveguide, relative to the Y-axis.

By way of example, with reference to FIG. 2, it can be seen that first order bounce lobes 122 of the uncorrected waveguide are at plus and minus 19 degrees relative to a central axis. In order to reflect these first order bounce lobes 122 into zero bounce order lobe 120, a mirror angle of half of 19 degrees, or in other words, 9.5 degrees is selected relative to the Y-axis. Therefore, bounce planes 24 of optical horn 25 are oriented at this mirror angle. The narrowing taper of waveguide 20 physically narrows the width of the laser beam coming out of lightguides 14. However, optical horn 25, on the other hand, angularly narrows the beam, just for first bounce order lobes 122. It should be understood that the specific angles discussed herein may vary depending on the particular size and shape of waveguide 20.

Figure 6:
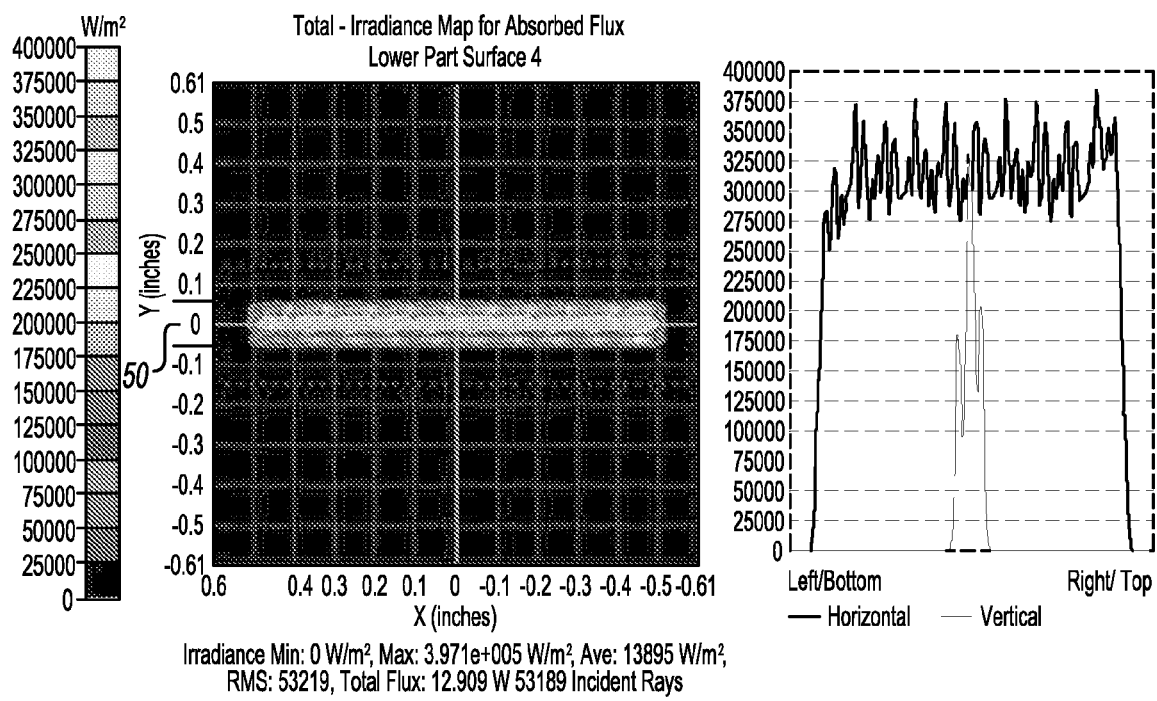
FIG. 6 is an irradiance plot at the surface between the transmissive piece and the absorptive piece of the welding apparatus illustrated in FIG. 4.

The angular distribution of the light after passing through optical horn 25 can be seen in FIG. 5. Comparison of FIG. 5 with FIG. 2 illustrates that the combined light lobe 28 is larger in magnitude. The magnitude of combined light lobe 28 in FIG. 5 includes both zero bounce order lobe 120 and the first order bounce lobes 122 of FIG. 2. The lobes to the side of combined light lobe 28 in FIG. 5 include all the higher order lobes of FIG. 2. The resultant weld pattern of the present teachings is illustrated in FIG. 6. The actual weld width is the region referenced as 50, which are just 0.03 inches wide in the present example that again uses a lightguide having a width of 0.1 inch. This is seven times narrower than the weld made with the waveguide without optical horn 25.

Figure 7:
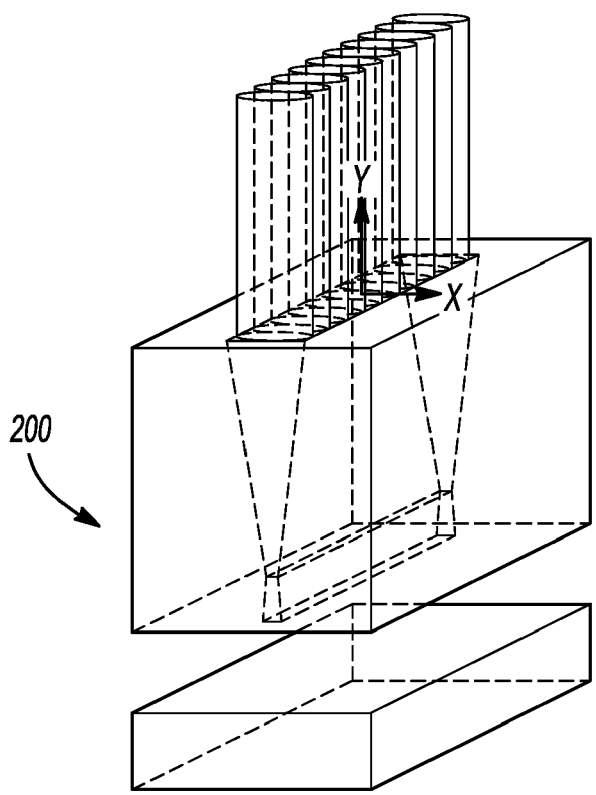
FIG. 7 is a schematic view illustrating a TTIr welding apparatus according to the principles of the present teachings employing a narrowing tapered waveguide in combination with an optical horn, having a less than optimal angle, for use in welding a transmissive piece (removed for clarity) to an absorptive piece.
Figure 8:
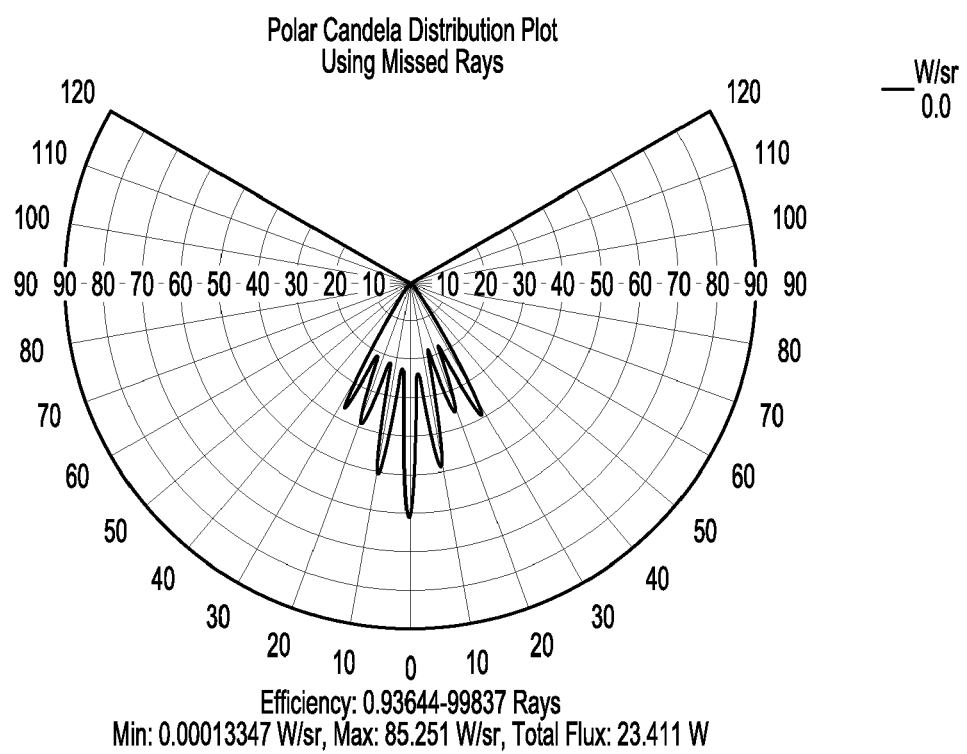
FIG. 8 is a candela plot of the welding apparatus illustrated in FIG. 7.
Figure 9:
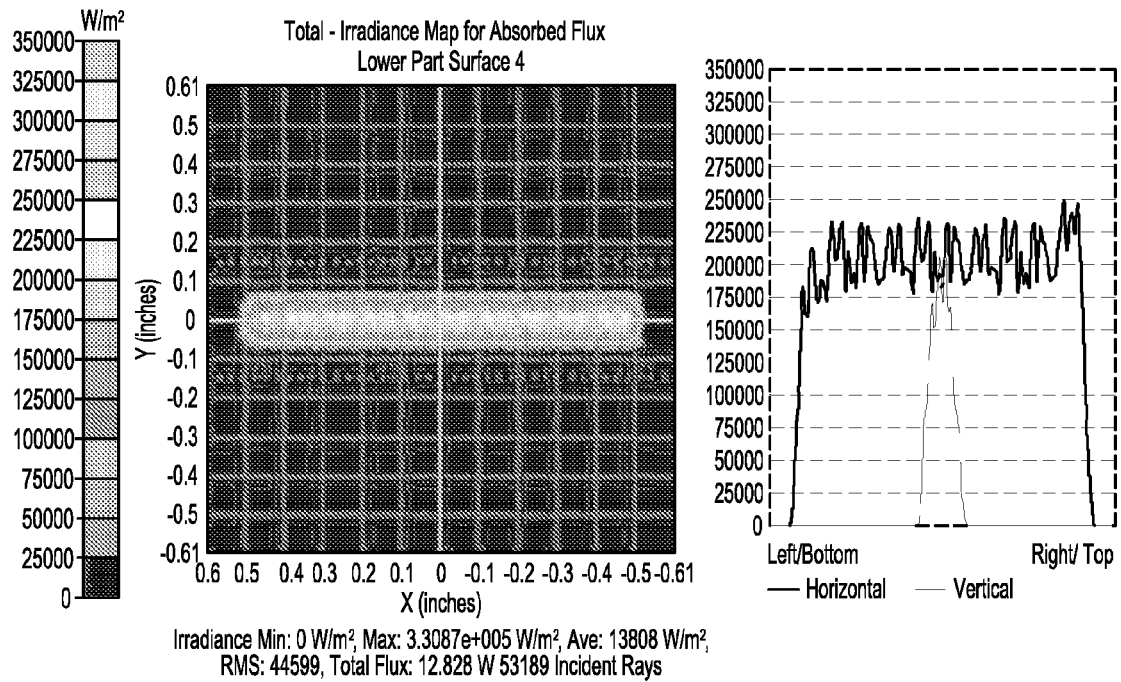
FIG. 9 is an irradiance plot at the surface between the transmissive piece and the absorptive piece of the welding apparatus illustrated in FIG. 7.

The choice of mirror angle for optical horn 25 is important—either too shallow an angle or too steep an angle will produce non-optimal results. This is because first bounce order lobes 122 will not be precisely lined up with zero bounce order lobe 120. For example, with reference to FIGS. 7-9, an optical horn angle that is about five degrees less than the optimal (for this example) is tested—specifically 4.5 degrees—and is generally referenced at 200. As can be expected, looking at the resultant angular distribution of light, after going through the too steep horn, it can be seen that the first order bounce lobes do not line up with the zero bounce order lobe. The lobes to either side of zero bounce order lobe 120 in FIG. 8 are the first order lobes of FIG. 2, except they are in reverse order because they have bounced past the center by 10 degrees to either side. This yields a non-optimal spread of light that results in a wider weld. This wider weld can be seen in FIG. 9, where the weld is 0.05 inches wide, which is 0.02 inches wider than the optimal weld.

Figure 10:
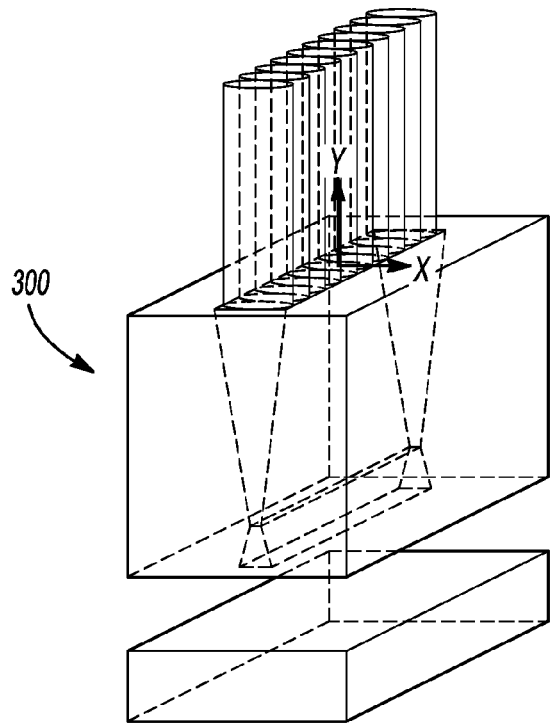
FIG. 10 is a schematic view illustrating a TTIr welding apparatus according to the principles of the present teachings employing a narrowing tapered waveguide in combination with an optical horn, having a greater than optimal angle, for use in welding a transmissive piece (removed for clarity) to an absorptive piece.
Figure 11:
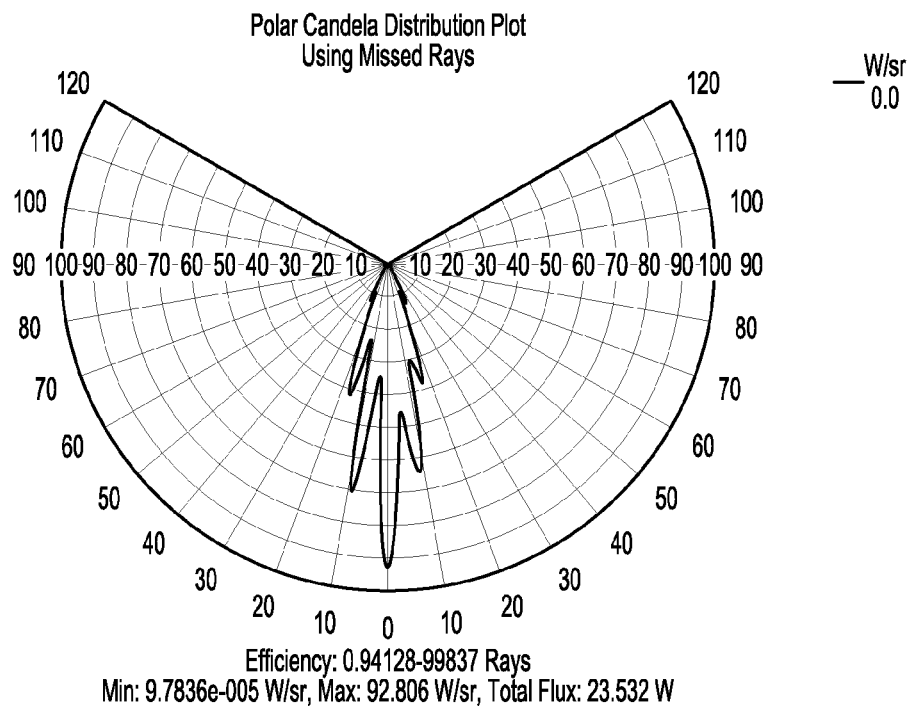
FIG. 11 is a candela plot of the welding apparatus illustrated in FIG. 10.
Figure 12:
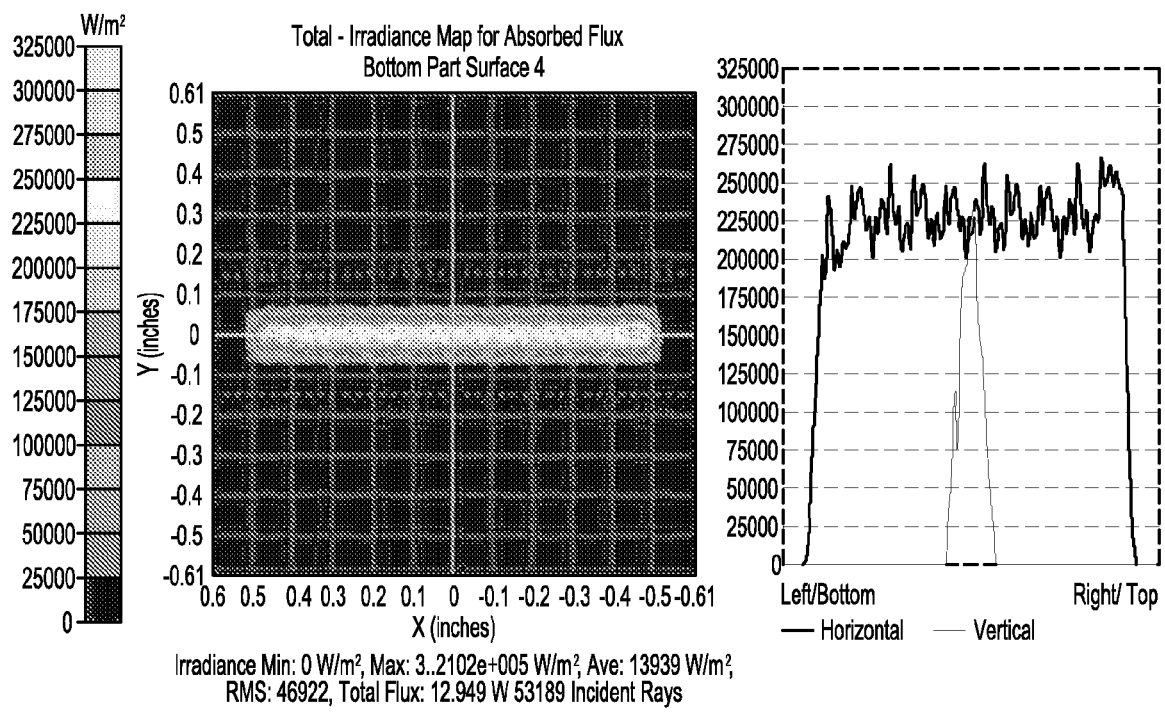
FIG. 12 is an irradiance plot at the surface between the transmissive piece and the absorptive piece of the welding apparatus illustrated in FIG. 10.

In the next example, with reference to FIGS. 10-12, an optical horn angle that is about five degrees greater than the optimal (for this example) is tested—specifically 14.5 degrees—and is generally referenced at 300. Once again we would expect first bounce order lobes 122 and zero bounce order lobe 120 to not line up, and therefore create a wider weld. As is illustrated in FIG. 11, this time the first order bounce lobes 122 from FIG. 2 do not bend enough to the center, and can be seen as the two lobes to either side of zero bounce order lobe 120. Once again, we would expect this non-optimal angular distribution to yield a non-optimal weld width. As can be seen in FIG. 12, this is the case. The weld is 0.05 inches wide, which is 0.02 inches wider than the optimal optical horn weld of the present invention.

An important note should be made at this point. It is a well known principle in optics that an expanding taper narrows the angular distribution of light going through it. An optical horn is an expanding taper. It would be expected from this principle, that the more optical horn 25 expands, the more the angular distribution of light would narrow, and thus the welds would be narrower. As can be seen from this example as illustrated in FIGS. 10-12, even though the angular distribution of light narrowed, the weld width expanded. The optimal angle for the optical horn is not a more expanding one, but exactly the angle that will reflect the first order bounce lobes into the zero bounce order lobe. Any other angle is not optimal. This clearly distinguishes the principles of the present teachings from a generally expanding taper.

Figure 13:
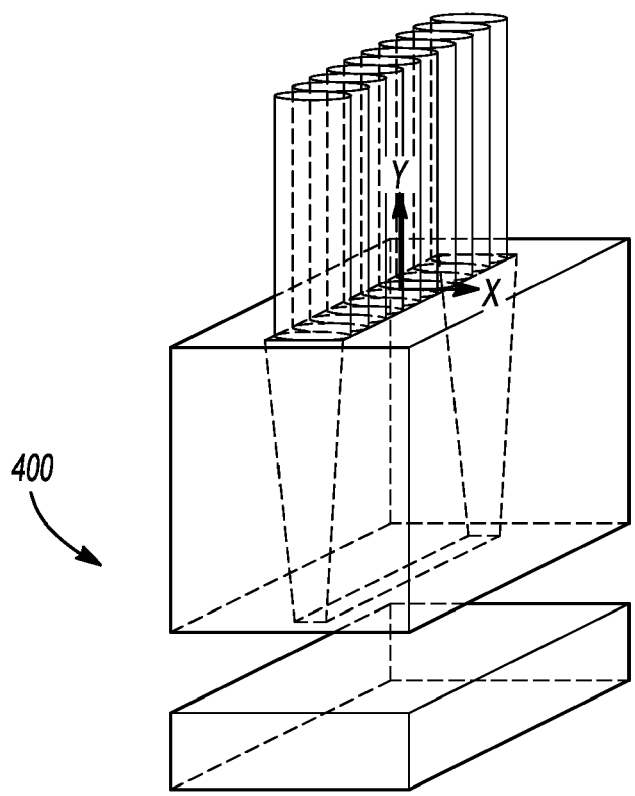
FIG. 13 is a schematic view illustrating a TTIr welding apparatus employing a narrowing tapered waveguide having an exit as wide as the previously illustrated optical horn for use in welding a transmissive piece (removed for clarity) to an absorptive piece.
Figure 14:
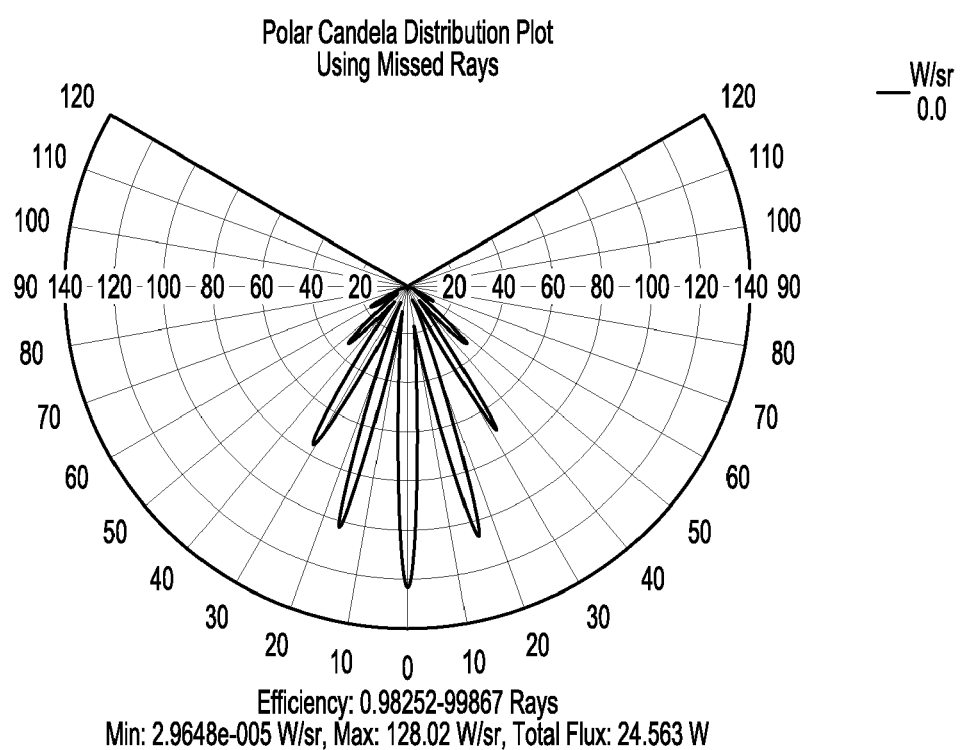
FIG. 14 is a candela plot of the welding apparatus illustrated in FIG. 13.
Figure 15:
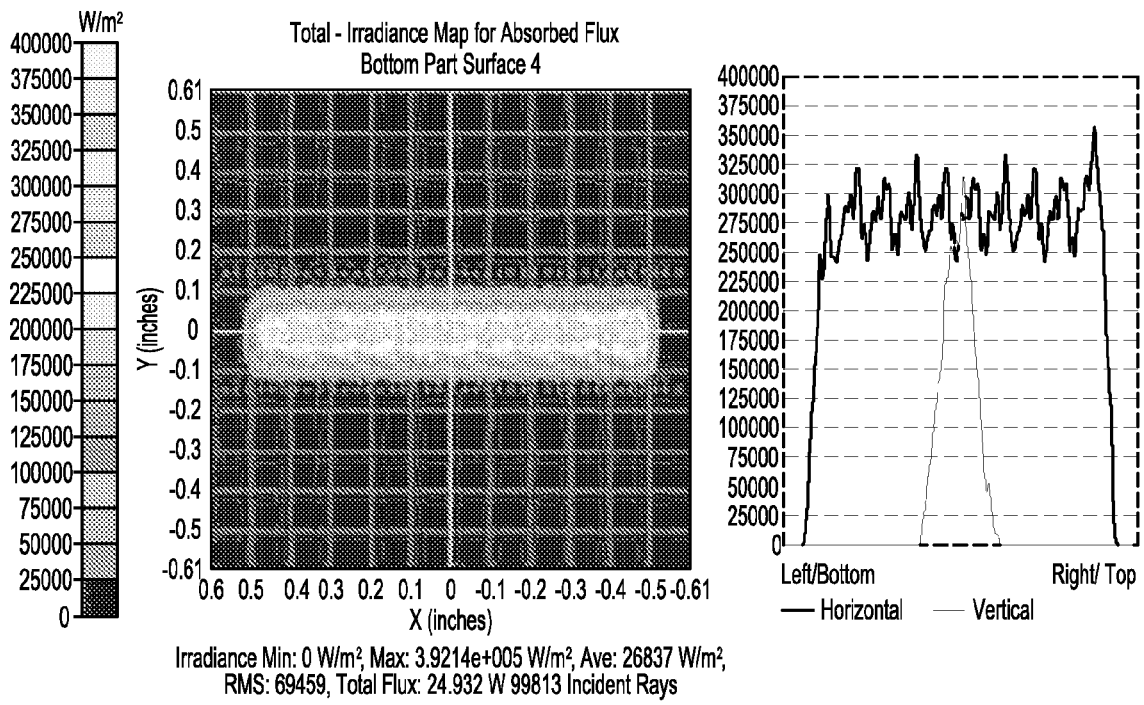
FIG. 15 is an irradiance plot at the surface between the transmissive piece and the absorptive piece of the welding apparatus illustrated in FIG. 13.

Optical horn 25 can not be replaced simply by forming the end of waveguide 20 to the width that optical horn 25 would otherwise be, as illustrated in FIGS. 13-15, and generally referenced at 400. By comparing the angular distribution exiting from a wider waveguide (FIG. 14) with that of a narrower waveguide (FIG. 2), it can be seen that the angular distribution is reduced. Comparing the wider waveguide angular distribution in FIG. 14 with the angular distribution with optical horn 25 as in FIG. 5, it can be seen that the angular distribution is much more spread out, thereby suggesting that the weld would also be much wider. As expected, and as illustrated in FIG. 15, the weld is indeed much wider. The weld is 0.075 inches which is 0.045 inches wider than the optimal optical horn weld of the present invention.

Figure 16:
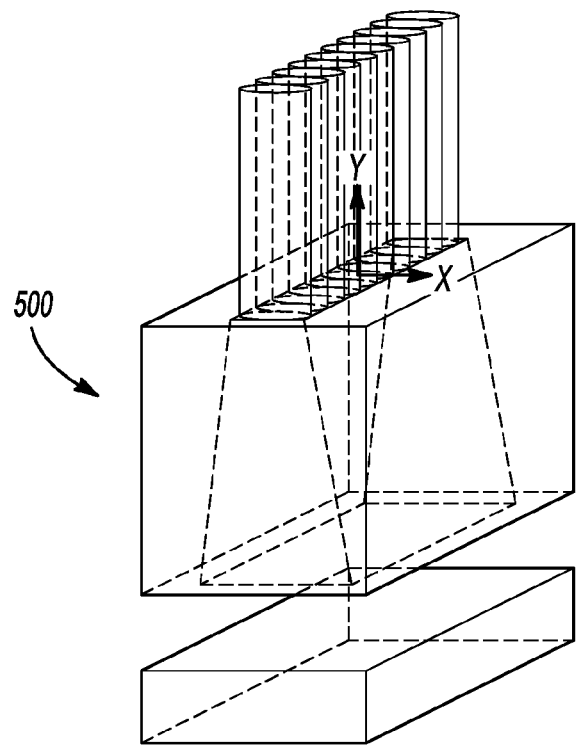
FIG. 16 is a schematic view illustrating a TTIr welding apparatus employing an expanding tapered waveguide having an angle mimicking the optimal angle of the optical horn for use in welding a transmissive piece (removed for clarity) to an absorptive piece.
Figure 17:
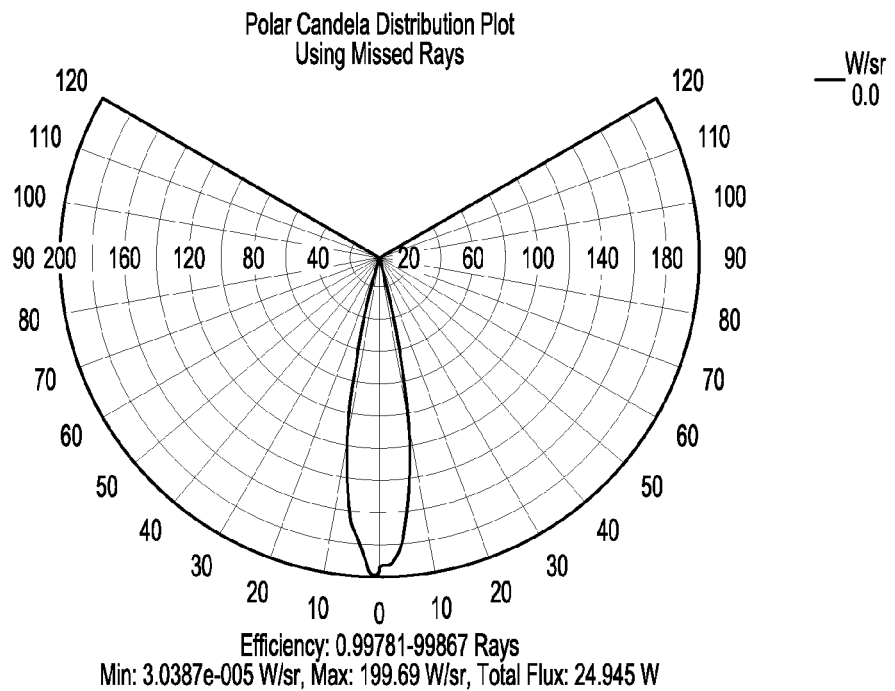
FIG. 17 is a candela plot of the welding apparatus illustrated in FIG. 16.
Figure 18:
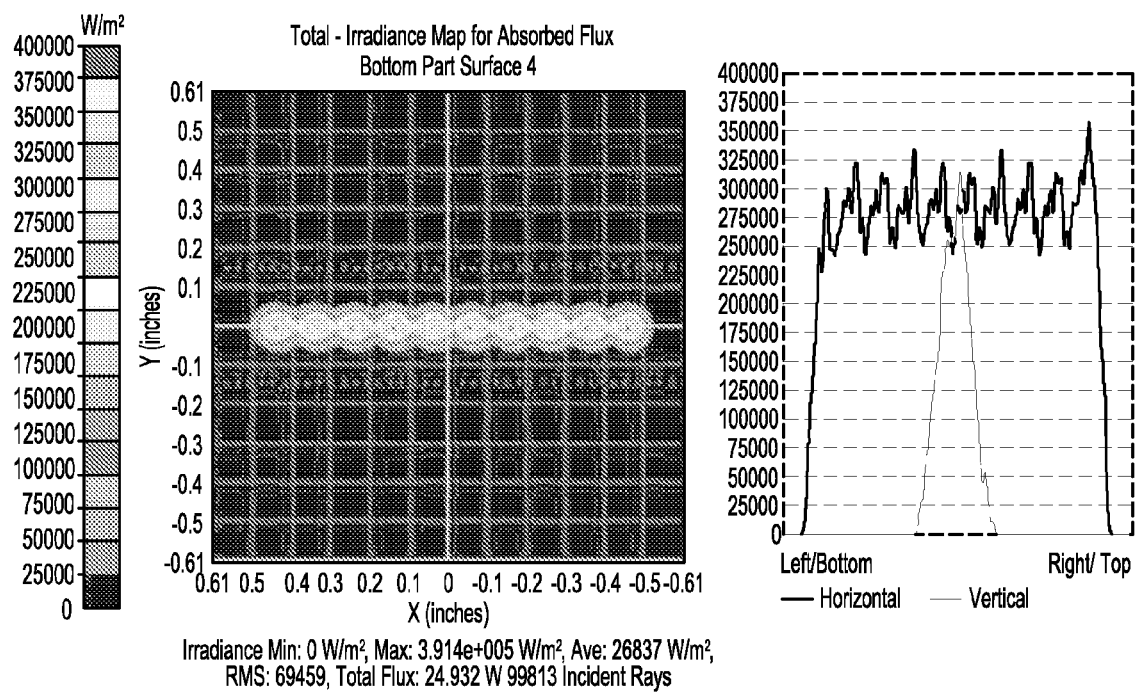
FIG. 18 is an irradiance plot at the surface between the transmissive piece and the absorptive piece of the welding apparatus illustrated in FIG. 16.

With particular reference to FIGS. 16-18, a generally expanding taper, generally referenced at 500, fails to produce weld zone 110 narrower than that produced in accordance with the present teachings. An expanding waveguide was chosen to have the same expansion angle of the optimal optical horn of 9.5 degrees. It would be expected that the angular distribution of the light would be narrower in the expanding waveguide than with the narrowing waveguide. However, comparing FIG. 2 and FIG. 17, it can be seen that the angular distribution of the expanding waveguide is narrower than the angular distribution of a narrowing waveguide. The angular distribution in FIG. 17 is just one narrow lobe, showing that the light does not even bounce within the waveguide. But this narrow angular distribution does not lead to a narrower weld. In fact, this arrangement produces a relatively wide weld: 0.08 inches, which is 0.05 inches wider than the optimal optical horn weld of the present invention. This graphically illustrates that a generally expanding taper is unable to achieve the narrow weld of lightguide assembly 10. The generally expanding taper narrows the angular distribution of light, but does not narrow the physical width of the weld. Lightguide assembly 10 is capable of reducing both the angular distribution of light and the physical width of the weld.

Figure 19:
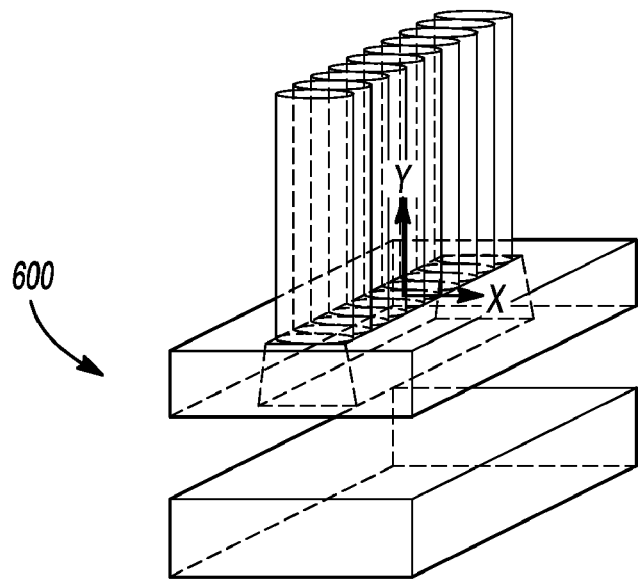
FIG. 19 is a schematic view illustrating a TTIr welding apparatus employing an expanding tapered waveguide having a length mimicking the optimal length of the optical horn for use in welding a transmissive piece (removed for clarity) to an absorptive piece.
Figure 20:
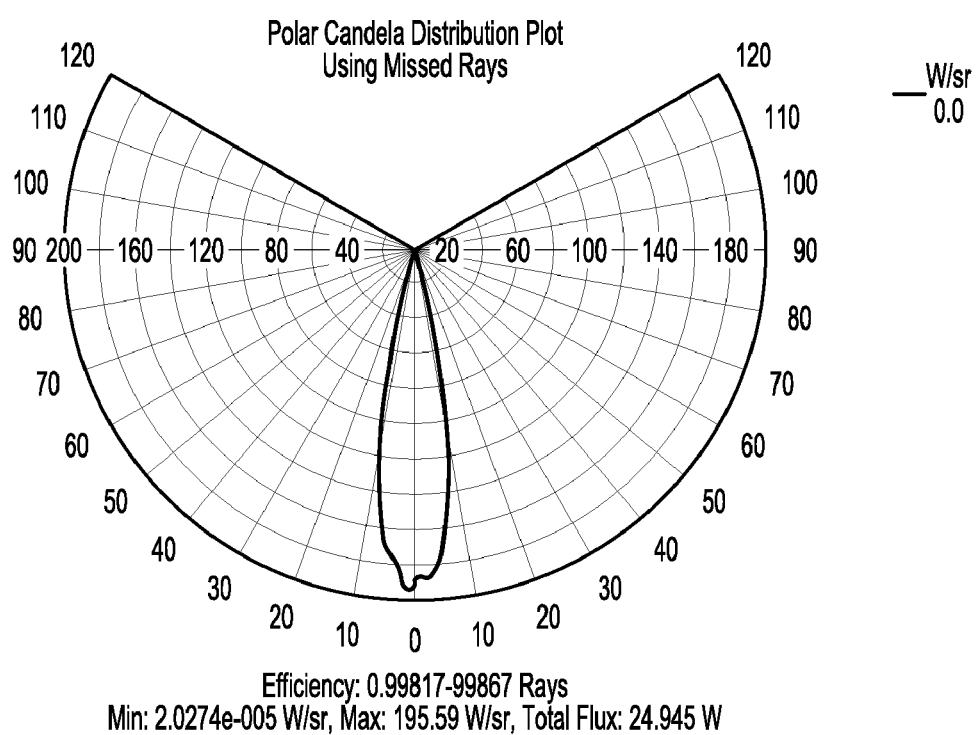
FIG. 20 is a candela plot of the welding apparatus illustrated in FIG. 19.
Figure 21:
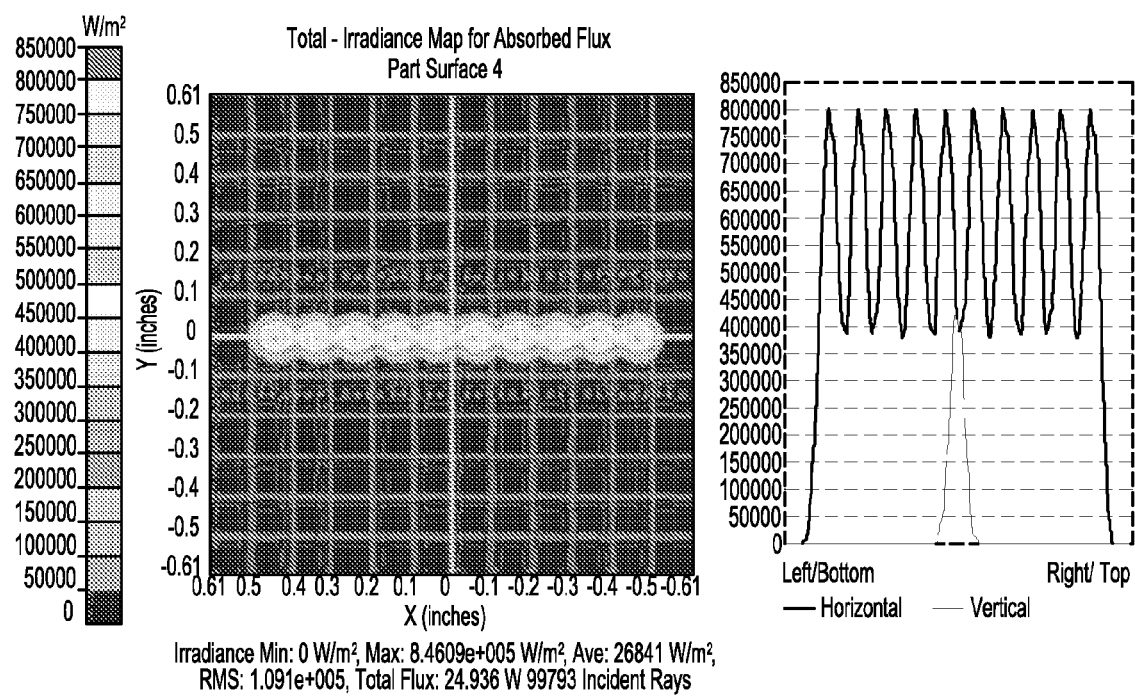
FIG. 21 is an irradiance plot at the surface between the transmissive piece and the absorptive piece of the welding apparatus illustrated in FIG. 19.

It can be argued that the reason the generally expanding taper in the previous example created a wide weld was because the waveguide was too tall. As a further example, the generally expanding taper was shortened to just the height of optical horn 25 as illustrated in FIG. 19 and generally referenced at 600, with the same angle of optical horn 25, of 9.5 degrees. Once again, it would be expected that the angular distribution of the light will be narrowed, and with the same gap between the waveguide and part, it might be expected that the weld would also be narrow. As can be seen in FIG. 20, the angular distribution of light is indeed narrow, only exhibiting one lobe. However, after reviewing the irradiance map at the part surface, as seen in FIG. 21, the weld is not narrowed, but is as wide as 0.08 inches, which is 0.05 inches wider than optimal optical horn weld of the present invention.

Once again this illustrates that a generally expanding taper does not do what a combination of narrowing waveguide and optical horn does. The generally expanding taper can narrow the angular distribution of light, but does not narrow the physical dimensions of the weld pattern. A generally narrowing waveguide (or taper) alone, expands the angular distribution of light, physically narrowing the dimensions of the light width at the outlet of the waveguide, but expanding the resultant weld pattern after the light travels the gap to the second part to be welded.

Only a narrowing waveguide, in combination with an optical horn, can both narrow the angular distribution of light and narrow the physical weld pattern. In fact, only the optimal selection of an optical horn angle can lead to the narrowest weld. This principle of an optical horn is unique, and is different in principle than a simple expanding taper or narrowing taper as shown in the previous examples.

As should be appreciated, the present invention enables a laser welding apparatus, which employs a lightpipe or lightguide, to produce a substantially narrower laser welding beam capable of producing a narrower weld zone compared to conventional laser welding apparatuses. Consequently, laser welding apparatuses using lightpipes or lightguides may now be used for a greater range of delicate welding operations and/or improved weld features. Additionally, the reflecting of the side light lobes into a concentrated combined light lobe provided improved welding efficiency.

What is claimed is:

1. A laser welding apparatus comprising:
    a laser source outputting a laser beam;
    a light transmitting device being positioned downstream from said laser source, said light transmitting device transmitting said laser beam therethrough, said laser beam exiting said light transmitting device having at least a zero order light lobe and a first order light lobe, said zero order light lobe and said first order light lobe together defining an initial beam width; and
    an optical device positioned downstream from said light transmitting device, said optical device converging said first order light lobe with said zero order light lobe to define a final beam width, said final beam width being narrower than said initial beam width.

2. The laser welding apparatus according to claim 1 wherein said laser beam exiting said light transmitting device comprises said zero order light lobe, said first order light lobe, and at least one higher order light lobe and wherein said optical device converging only said first order light lobe with said zero order light lobe.

3. The laser welding apparatus according to claim 1 wherein said optical device comprises an optical horn having an outwardly tapered bounce plane.

4. The laser welding apparatus according to claim 3 wherein said outwardly tapered bounce plane defines a first angle relative to a central axis and said light lobes exiting said light transmitting device define a second angle relative to said central axis, said first angle being one half of said second angle.

5. The laser welding apparatus according to claim 1 wherein said light transmitting device is integrally formed with said optical device to form a single unit.

6. A laser welding apparatus comprising:
    a laser source outputting a laser beam;
    a light transmitting device being positioned downstream from said laser source, said light transmitting device transmitting said laser beam therethrough, said laser beam exiting said light transmitting device having at least a zero order light lobe, a first order light lobe, and a second order light lobe; and
    an optical device positioned downstream from said light transmitting device, said optical device converging said first order light lobe with said zero order light lobe without converging said second order light lobe with said zero order light lobe.

7. The laser welding apparatus according to claim 6 wherein said optical device comprises an optical horn having an outwardly tapered bounce plane.

8. The laser welding apparatus according to claim 7 wherein said outwardly tapered bounce plane defines a first angle relative to a central axis and said light lobes exiting said light transmitting device define a second angle relative to said central axis, said first angle being one half of said second angle.

9. The laser welding apparatus according to claim 6 wherein said light transmitting device is integrally formed with said optical device to form a single unit.

10. A method of laser welding a first part to a second part, said method comprising:
    outputting a laser beam;
    passing said laser beam through a light transmitting device such that said laser beam exiting said light transmitting device defines at least a zero order light lobe, a first order light lobe, and a second order light lobe; and
    passing said laser beam exiting said light transmitting device through an optical device such that said optical device converges said first order light lobe with said zero order light lobe to define a combined light lobe without converging said second order light lobe with said zero order light lobe; and
    heating at least one of a first part and a second part with said combined light lobe to create a weld therebetween.

* * * * *